(12) United States Patent
Xin

(10) Patent No.: US 10,004,336 B2
(45) Date of Patent: Jun. 26, 2018

(54) METHOD AND APPARATUS FOR SUPPORTING NORMAL FUNCTIONS OF BLOOD CIRCULATORY SYSTEMS OVER LONG PERIODS OF SITTING

(71) Applicant: Alfred Xueliang Xin, Cincinnati, OH (US)

(72) Inventor: Alfred Xueliang Xin, Cincinnati, OH (US)

( * ) Notice: Subject to any disclaimer, the term of this patent is extended or adjusted under 35 U.S.C. 154(b) by 287 days.

(21) Appl. No.: 14/941,640

(22) Filed: Nov. 15, 2015

(65) Prior Publication Data

US 2017/0135488 A1    May 18, 2017

(51) Int. Cl.
| | | |
|---|---|---|
| A47C 7/02 | (2006.01) | |
| A47C 7/14 | (2006.01) | |
| A47C 7/62 | (2006.01) | |
| G05B 15/02 | (2006.01) | |
| A47C 31/12 | (2006.01) | |

(52) U.S. Cl.
CPC .............. *A47C 7/022* (2013.01); *A47C 7/021* (2013.01); *A47C 7/14* (2013.01); *A47C 7/62* (2013.01); *A47C 31/126* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 4,718,727 A | * | 1/1988 | Sheppard | A47C 7/022 297/452.26 |
| 5,022,385 A | * | 6/1991 | Harza | A61H 1/0292 601/149 |
| 7,931,334 B1 | * | 4/2011 | Caruso | A47C 7/022 297/217.3 |
| 8,181,292 B1 | * | 5/2012 | Pellettiere | B60N 2/42709 244/122 R |
| 8,398,170 B2 | * | 3/2013 | Walker | A47C 7/022 297/284.1 |
| 9,346,385 B2 | * | 5/2016 | Sachs | A61H 9/0078 |
| 9,427,086 B2 | * | 8/2016 | Willingham | A47C 3/12 |
| 2017/0164747 A1 | * | 6/2017 | Zouzal | A47C 7/14 |

* cited by examiner

*Primary Examiner* — Sarah Burnham McPartlin

(57) ABSTRACT

The present invention, method and apparatus, relates to supporting normal functions of blood circulatory systems over extended periods of sitting. The invented apparatus and method help blood circulatory systems function normally, while keeping body and or sitting pose unchanged. Keeping body and or sitting pose unchanged are necessary in many circumstances involving extended periods of sitting such as driving an automobile, or sitting without being interrupted by unwanted moves from the seat.

17 Claims, 6 Drawing Sheets

Logic flowchart of an embodiment

METHOD AND APPARATUS FOR SUPPORTING NORMAL FUNCTIONS OF BLOOD CIRCULATORY SYSTEMS OVER LONG PERIODS OF SITTING

FIELD OF THE INVENTION

The present invention relates to supporting normal functions of blood circulatory systems for an extended periods of sitting. When people sit in a seat for an extended periods of time, the part of blood circulatory systems via buttocks and upper thighs are largely blocked or impaired by body weight against the seat. While keeping seat unmoved and maintain body and sitting pose unchanged, the invented method and apparatus releases pressures on buttocks and upper thighs against seat and helps blood circulatory system function normally.

PRIOR ARTS CITED

| U.S. Patents Documents | | |
|---|---|---|
| 5,913,568 | June 1999 | Brightbill |
| 7,681,948 | March, 2010 | Dunn |
| 6,049,748 | April, 2000 | Mojica |
| 6,079,782 | June 2000 | Berg |
| 6,243,635 | June, 2001 | Cuchlinski, Jr. |
| 6,340,207 | January 2002 | Brightbill |
| 6,357,827 | March 2002 | Brightbill |
| 6,595,586 | July, 2003 | White; Rodney B. |
| 7,396,802 | July, 2008 | Brown; Peter R. |
| 7,669,928 | March, 2010 | McPartlin |
| 8,360,517 | January, 2013 | McPartlin |
| 9,022,474 | May, 2015 | Gabler |
| 9,096,147 | August 2015 | Gabler |

| Foreign Patents Documents | | |
|---|---|---|
| 1088696 | September 2000 | EP |
| 1050429 | November 2000 | EP |
| 1123834 | February 2001 | EP |
| 1266794 | December 2002 | EP |
| 1 075 984 | May 2003 | EP |
| 1323573 | July 2003 | EP |
| 1149746 | August 2005 | EP |
| 1266925 | September 1960 | FR |
| 2599683 | June 1986 | FR |
| 2630056 | October 1989 | FR |
| 2694527 | February 1994 | FR |
| 2845318 | April 2004 | FR |
| 1171509 | July 1989 | JP |
| 5277020 | October 1993 | JP |
| 8285423 | November 1996 | JP |
| 10044756 | February 1998 | JP |
| 2000125990 | February 2000 | JP |
| 2001071800 | March 2001 | JP |
| 2002125801 | May 2002 | JP |
| 2002225539 | August 2002 | JP |
| 2002234332 | August 2002 | JP |
| 2003042594 | February 2003 | JP |
| 2004224108 | August 2004 | JP |
| 2004283403 | October 2004 | JP |
| 202556 | March 1966 | SE |
| 0102983 | March 2003 | SE |
| WO 91/12150 | August 1991 | WO |
| WO 94/09684 | May 1994 | WO |
| WO 96/05475 | February 1996 | WO |
| WO 97/09908 | March 1997 | WO |
| WO 99/00268 | January 1999 | WO |
| WO 02/06914 | January 2002 | WO |
| WO 02/005341 | July 2002 | WO |

| Foreign Patents Documents | | |
|---|---|---|
| WO 03/015583 | February 2003 | WO |
| WO 03/051666 | June 2003 | WO |
| WO 03/077710 | September 2003 | WO |
| WO 03/101777 | December 2003 | WO |
| WO 03/106215 | December 2003 | WO |
| WO 2004/005068 | January 2004 | WO |
| WO 2004/082989 | March 2004 | WO |
| WO 2004/028857 | April 2004 | WO |
| WO 2004/078517 | September 2004 | WO |
| WO 2004/091966 | October 2004 | WO |
| WO 2004/091967 | October 2004 | WO |
| WO 2004/096601 | November 2004 | WO |
| WO 2004/096602 | November 2004 | WO |
| WO 2005/021320 | March 2005 | WO |
| WO 2005/035305 | April 2005 | WO |
| WO 2005/042299 | May 2005 | WO |
| WO 2005/042301 | May 2005 | WO |
| WO 2005/047056 | May 2005 | WO |
| WO 2005/068253 | July 2005 | WO |
| WO 2005/110806 | November 2005 | WO |

BACKGROUND OF THE INVENTION

Health risks related to extended periods of sitting are well-known. Researches have linked sitting for long periods of time with many health concerns, including metabolic syndrome—a cluster of conditions including high blood pressure, and it is also linked to risks of death from cardiovascular disease, vein twitching and varicose veins, muscle spasm and other health issues.

These problems are greatly due to circulatory systems, including arteries and veins, are largely blocked or impaired at upper thigh and buttocks, especially when we sit in a well-fitted, soft and comfortable seat. By comparison sitting in a hard surface chair without cushion may not feel comfortable, however since the body weight against chair is only with small areas of buttocks covering ischium (part of hips bones directly against seat).

There are great numbers of inventions and innovations related to sitting in prior arts. These invented technologies are mostly concentrated on improving sitting with comfort, conveniences, and applying modern technologies to maneuver details in sitting poses and touches, such improvements may not help and support normal functions of circulatory systems over an extended periods of sitting.

The present invention, apparatus and method, relates to supporting normal functions of blood circulatory systems over an extended periods of sitting. The invented apparatus and method help arteries and veins to circulate normally, while keeping body and or sitting poses unchanged. Keeping body and or sitting poses unchanged are necessary in many circumstances involving extended periods of sitting such as driving or sitting in an automobile, or sitting requiring not being interrupted by unwanted moves from the seat.

SUMMARY OF THE INVENTION

The invented apparatus has a platform consisted of non-active and active components, an actuator, a mechanical controller or hydraulic pressure controller or pneumatic pressure controller, is connected to the active components of the platform, a computerized-control system is connected to the actuator and sensors installed on the platform.

The non-active component, extending from the front end of the seat to the back or close to the back end of the seat and narrow at the front and gradually widened in bicycle-seatlike shape, is located in the middle of the seat; an active component or a group of active components on each side of the non-active component extending from the front end of the seat to the back or close to the back end of the seat cover areas on each side of the seat.

When a person sits in the seat his ischium bones directly sitting on the non-active component in the middle of the seat, like sitting on a bicycle seat. As the apparatus starts to operate with programmed motion patterns, timespans and time intervals, the active components descend one side after the other or both sides at the same time and then after a period of time raise back to their original levels repeatedly with pre-determined timespans and intervals. Each descending yields spaces just enough to allow buttocks and upper thighs to be released from pressures created by body weight against the seat, and to help arterial and vein circulations. Regardless whether active components descend one side after the other or at the same time on both sides, the person's body and sitting pose won't be affected as his main body structure sits on the non-active component like sitting on a bicycle seat.

Components of the platform, non-active and active, may be of panels made of hard materials such like metals and plastics, or soft compartments made of flexible materials such like rubber and filled with liquid or air.

If the active components are made of hard materials they are connected to a mechanical controller; if the active components are made of soft compartments they are either connected to a hydraulic pressure controller or pneumatic pressure controller.

Multiple active components on each side of the non-active component are installed to meet a variety of needs and conditions. For instance if the front end of the seat is higher than the back end, it is especially true for armchairs and sofa with cushion and the person sitting on them leaning back and or the front end seat raised higher than the back end, then it may need active components at and close to the front end of the seat to descend more than other components covering the other sections of the seat, so that pressures allocated over upper thighs may be released.

An angular sensor installed on the apparatus and connected to the computerized-control system. When seat angle is changed the apparatus is capable of adjusting pressure release and increase levels of the components in different areas of the platform in response to different angle-level of the seat and providing the best space and angle for helping normal functions of circulatory systems.

Pressure sensors are installed on different parts of the platform. By pinpointing body weight center lodged on the seat the active components may be adjusted to fit the various sitting positions. Further when sitting positions are changed in the chair, pressure sensors may send signals to the computerized-control system and adjust active components status, or when one side of chair receive much more weight than the other side, the computerized-control system may send visual, audio or voice signals via a system-control interface to remind the person to sit in middle, before start to operate the apparatus.

The apparatus shall immediately be stopped to operate when an unusual situation occurs. For instance the apparatus is installed underneath a driver's seat in an automobile if the driver starts to accelerate or decelerate the automobile, suddenly puts on brakes or abnormal road conditions, the apparatus shall be stopped to operate and keeping the active components stay at where they are at the moment when an unusual situation related to seating and or surrounding conditions occurs.

The apparatus may be activated by pressure sensors installed on the platform and turned on by body weight, or by receiving commands from a system-control panel configured with the computerized-control system.

The apparatus shall automatically return to its starting position as soon as the seat is unoccupied.

The apparatus may either be configured with a seat installed in automobiles, airplanes, armchairs, wheel chairs and etc., or designed and manufactured as portal products with plug and play features and put in any seat at any time.

DESCRIPTIONS OF PREFERRED EMBODIMENTS

Figure 1:
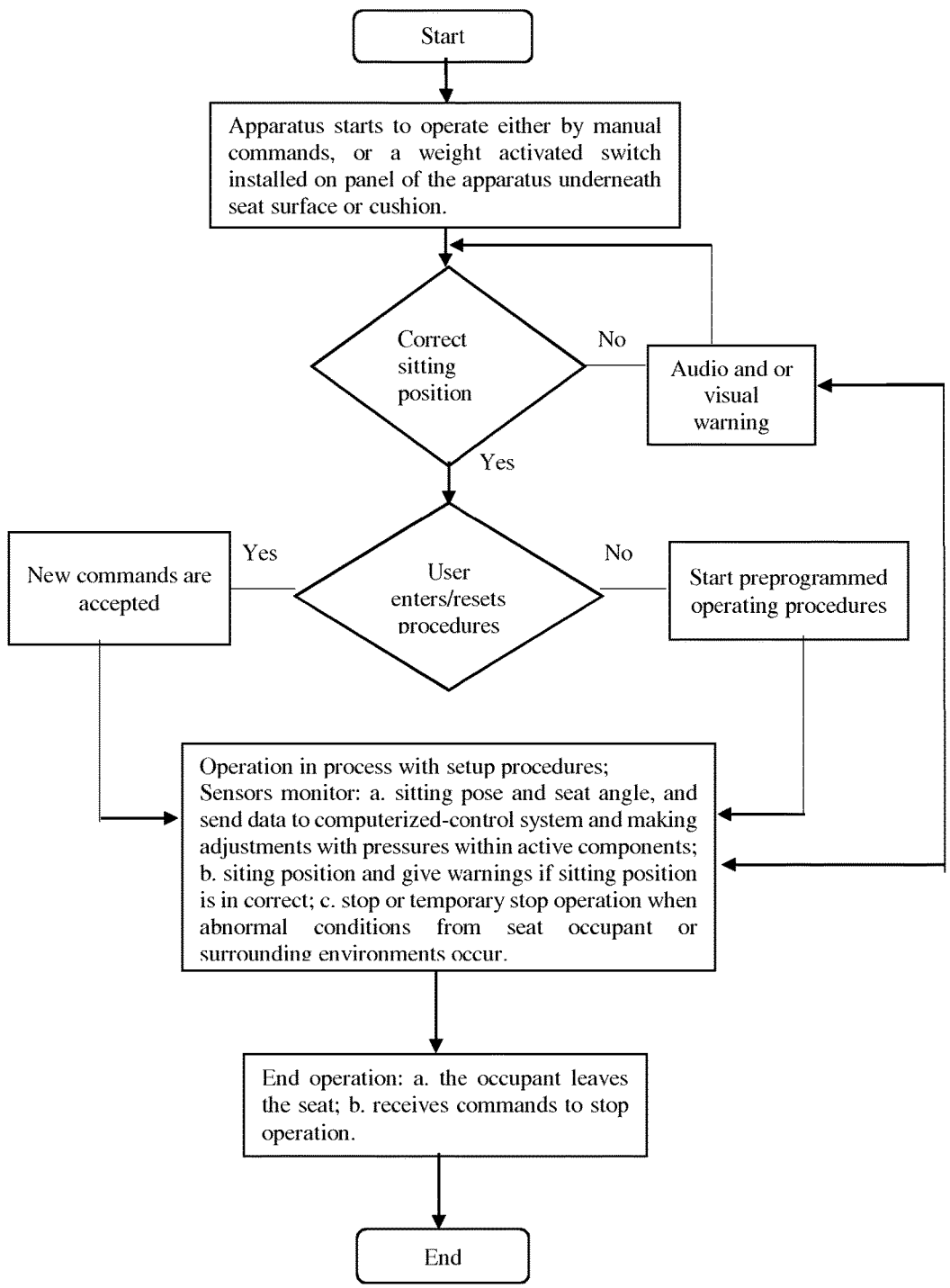
FIG. 1 is logic flowchart of an embodiment of the apparatus.
Figure 2:
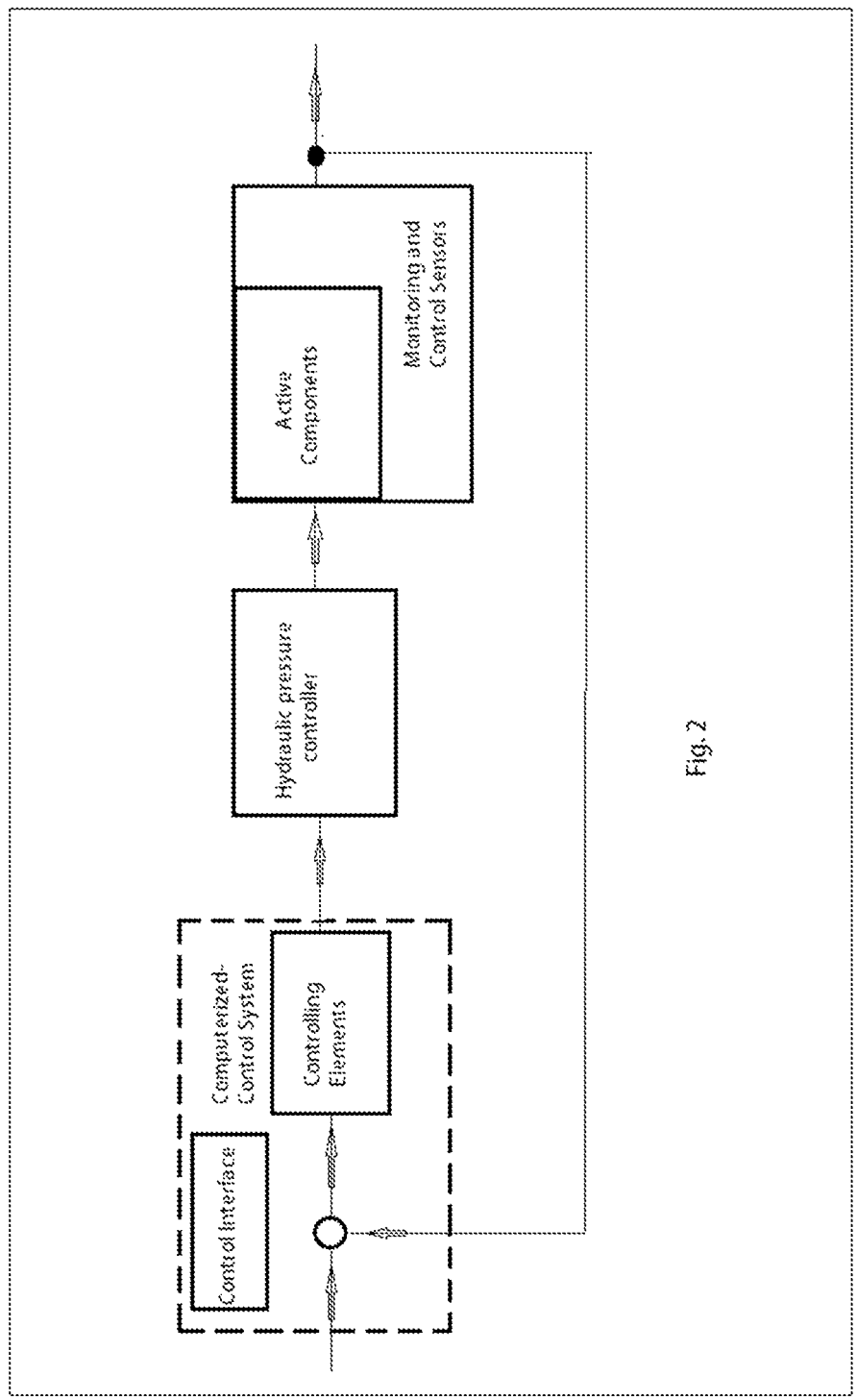
FIG. 2 is a closed-cycle engineering design flowchart of an embodiment of the apparatus.
Figure 3:
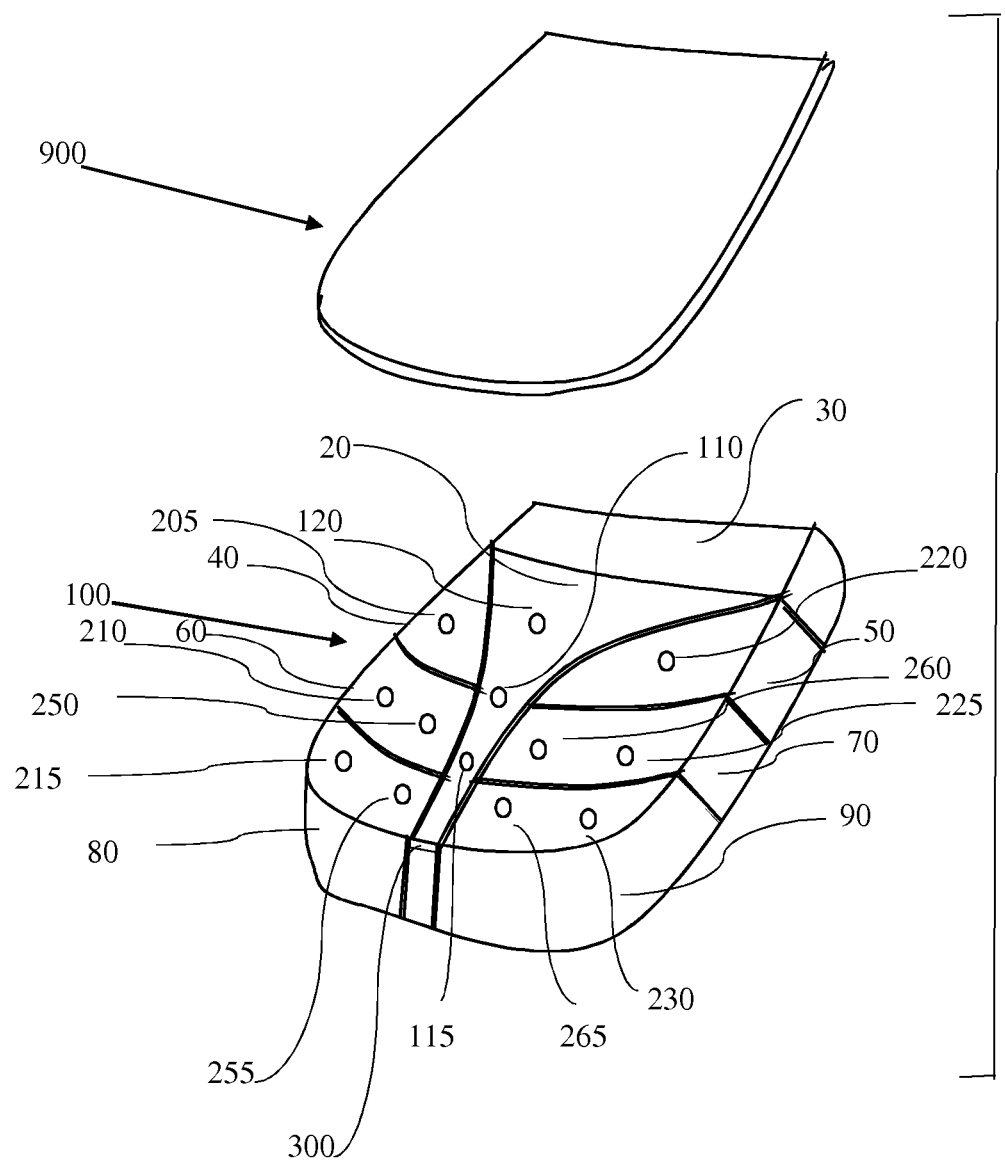
FIG. 3 is a configuration of the apparatus at non-operation stage.
Figure 4:
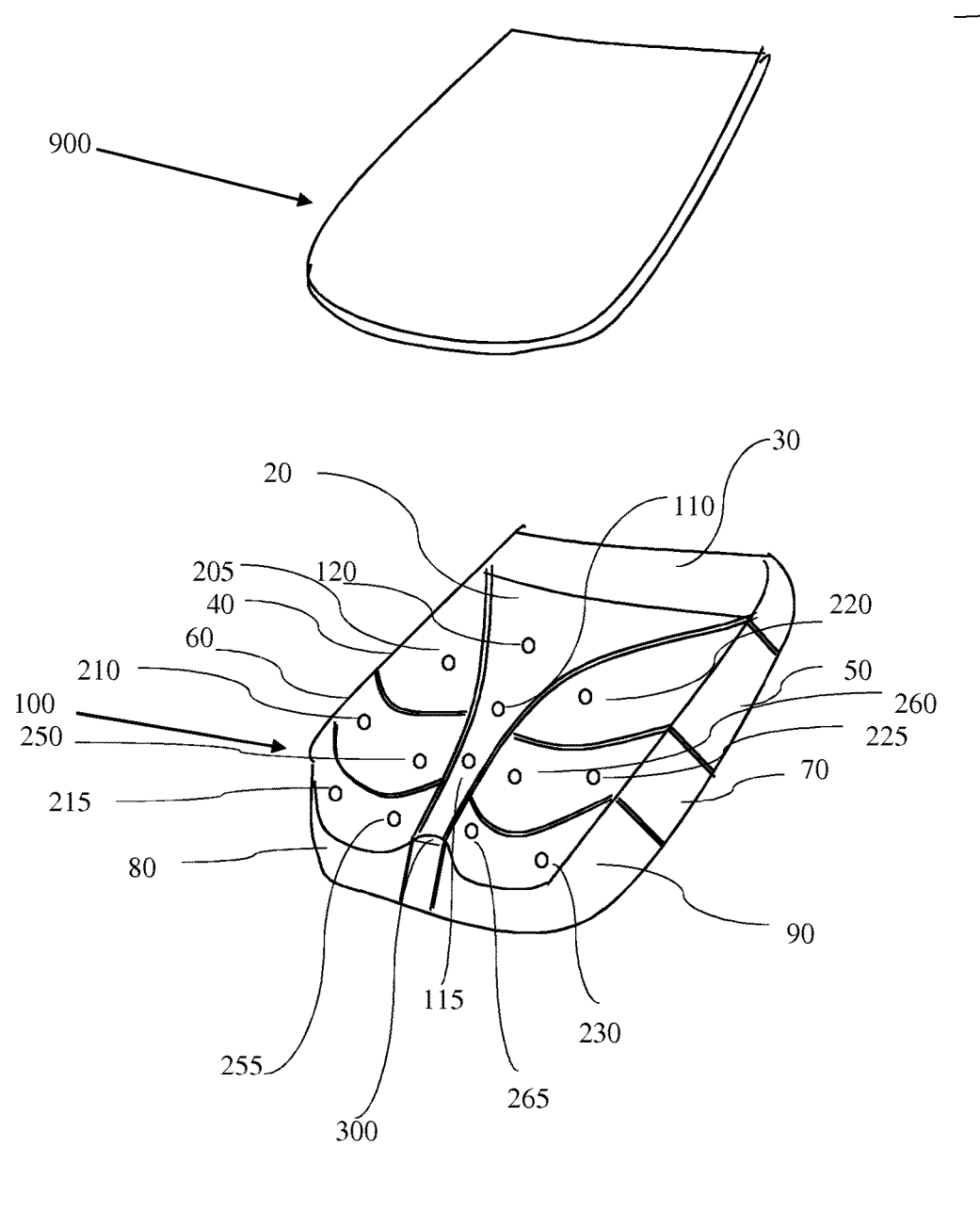
FIG. 4 is a working stage of the apparatus.
Figure 5:
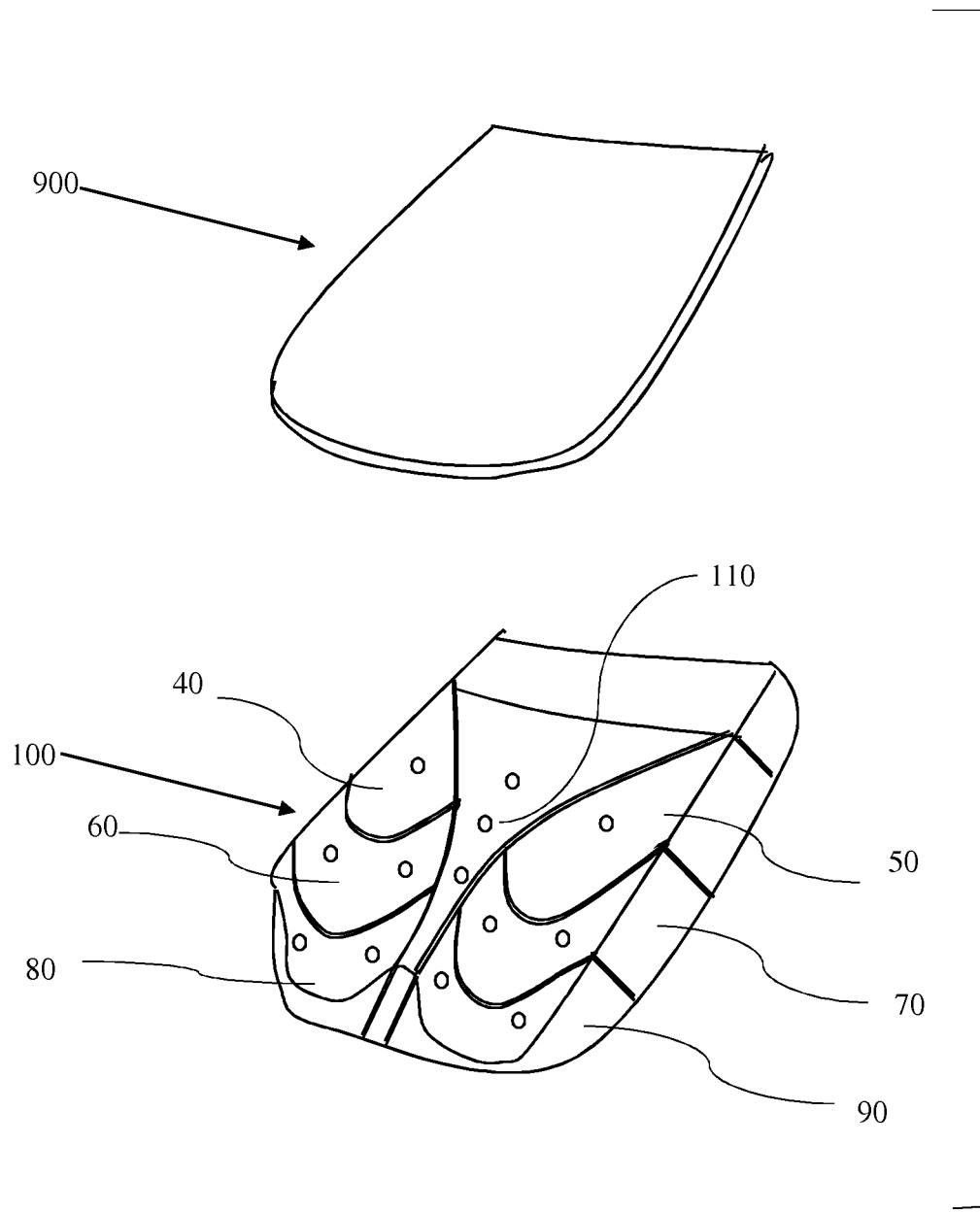
FIG. 5 is another working stage of the apparatus.

An embodiment in accordance with the invention, and with reference to FIGS. 1, 2 and 3, the invented apparatus is inserted or configured underneath surface or cushion (FIG. 3—900) of a chair in automobile, armchair or wheelchair and etc. The platform of the apparatus made in shape of a seat consists of non-active and active components (FIG. 3—100).

A non-active component (FIG. 3—20) extending from the front end of the seat to close to the back end of the seat, narrow at the front end and gradually widened in bicycle-seat-like shape, is located in the middle of the seat; The non-active component is made of hard materials such as sealed molded-plastic compartment and hollow inside. The non-active compartment also functions as a reservoir and is connected to a hydraulic pressure controller located in a compartment of the apparatus (FIG. 3—30).

Three active components on each side of the non-active components covering rest of the seat areas (FIG. 3—40, 50, 60, 70, 80, 90) are made of flexible materials such as high strength robber compounds and inflated with fluid and connected to the hydraulic pressure controller.

When a person sits on the seat, pressure sensors (FIG. 3—115, 120), function as off-and-on switches, send signals to computerized-control system located in a compartment on the apparatus (FIG. 3—30) and the apparatus starts to operate under preprogrammed procedures. An angular sensor (FIG. 3—110) installed on the non-active component measures seat angle and sends data to the computerized-control system.

Under preprogrammed procedures, the apparatus takes first move cycle after the person sitting on the seat for 10 minutes; it takes 10 seconds for the hydraulic pressure controller to release fluid from active components to the reservoir and complete the process of generating space on each side of the non-active component (FIG. 4—40, 50, 60, 70, 80, 90); the positions of active-components remain unchanged for 40 seconds and then it takes 10 seconds for the hydraulic pressure controller to pump back fluid to the active-component from the reservoir and returning to their starting positions. This move cycle repeats every 5 minutes.

Such slow move process is to ensure that moves of the active-components won't distract attention of the person sitting in the seat.

When a move cycle starts, the computerized-control system receives data from the angular sensor (FIG. 4—110) and sends signals to the hydraulic pressure controller which releases fluid within different active-component to the reservoir inside non-active component (FIG. 4—20) with predetermined amount for each active-component according to predetermined space-releasing level for each active component. If seat angle is small, space-releasing level generated by active components (FIG. 4—40, 50, 60, 70, 80, 90), especially the front end active components (FIG. 4—80, 90) is not as much as if seat angle is big (the front end of seat is much higher than the back end of the seat) (FIG. 5—40, 50, 60, 70, 80, 90), and the front end active components (FIG. 5—80, 90) would have to generate more space.

A layer of flexible material covering surface of the non-active component (FIG. 4—300) when spaces are created by active-components body weight of the person in the seat pressures down, the continuing flexible surface covering entire surface of the panel and creating a smooth and natural curves on the surface of the panel and therefore the person sitting in the chair won't feel uncomfortable during the operation of the apparatus.

Pressure sensors (FIG. 4—205, 210, 215, 220, 225, 230, 250, 255, 260, 265) installed on the apparatus monitor seating position of the person sitting on the seat. If the person is not sitting in the middle of the seat, pressure sensors on both sides of the seat shall send data to the computerized-control system; the computerized-control system sends verbal or visual warming signals via a system-control interface, and at the same time commands the apparatus to return to its starting positions (FIG. 3—100). The apparatus will only resume to operate when the person sits correctly in the middle of the seat.

If the apparatus is inserted in and configured with a seat in an automobile, the system-control interface in form of control panel is configured on dashboard or any convenient locations and the person occupying the seat may select functions on the control panel and change operation cycle pattern and other options.

If the apparatus is inserted in and configured with an armchair, wheelchair and etc., the control panel may be installed at a convenient place on the chair.

The hydraulic pressure controller of the apparatus may be replaced by a pneumatic pressure controller connected to the active components and the computerized-control system. By controlling air pressures within the active components the apparatus operates and functions the same.

The actuator and computerized-control systems may be installed at any place on the seat for the best arrangements of the components and or configuration along with other equipped devices on the seat.

Figure 6:
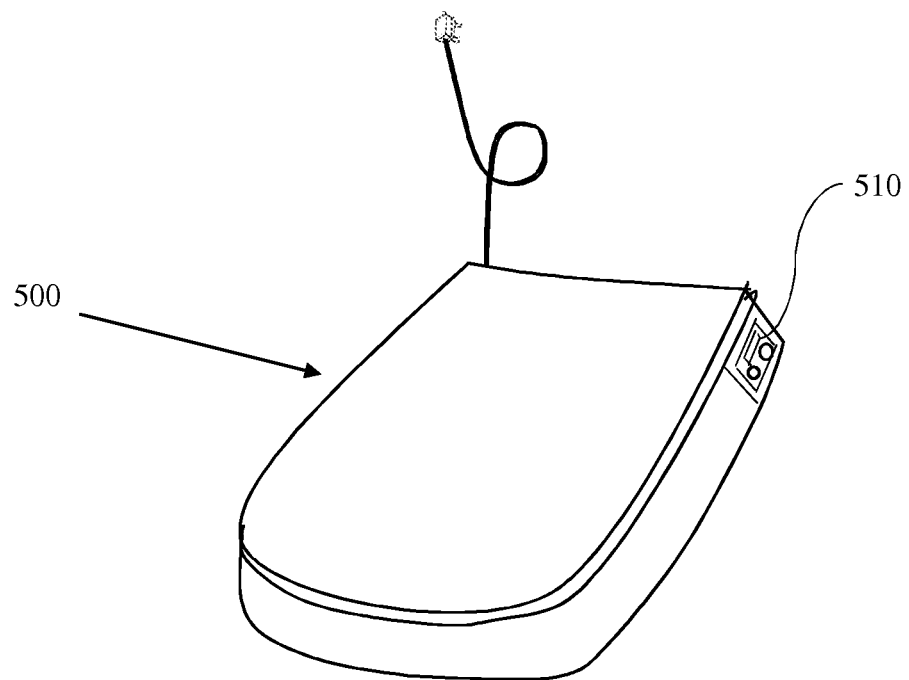
FIG. 6 is an image of portable design of the apparatus, not configured with a seat.

Another embodiment in accordance with the invention, and with reference to FIG. 6. The invented apparatus is designed as a standalone product (FIG. 6—500) and a control-panel (FIG. 6—510) is located on a compartment as shown in FIG. 3 (FIG. 3—30) of the apparatus and connected to computerized-control system which is also located in the same compartment. A user may put the apparatus on a seat and plug in the apparatus to a power outlet and make the apparatus start to operate.

The embodiments are mainly a few illustrations of the invention, advantages of the invention may be learned by practice, realized and attained by means of the elements and combination particularly pointed out in claims. Further it is understood that both the foregoing general descriptions and detailed descriptions are exemplary and explanatory only and are not limited to the invention as claimed.

It claims:

1. A seat apparatus configured to promote improved circulatory conditions for a user superposed thereon comprising:
   a body, said body having a front end and a rear end, said body having a left side and a right side, said body having an upper surface and a lower surface, said body configured to have a user superposed on said upper surface;
   a non-active component, said non-active component being centrally located on said body, said non-active component extending from said front end of said body to said rear end of said body, said non-active component being rigid and having an interior volume, said non-active component being formed having a width proximate the front end of said body that is less than the width proximate the rear end of said body;
   a first active component, said first active component being adjacent said non-active component proximate said left side of said body, said first active component having an interior volume, said first active component being manufactured from an expandable material, said first active component having a first position and a second position;
   a second active component, said second active component being adjacent said non-active component proximate said right side of said body, said second active component having an interior volume, said second active component being manufactured from an expandable material, said second active component having a first position and a second position;
   a controller, said controller being disposed in said body, said controller being fluidly coupled with said first active component and said second active component, said controller further being fluidly coupled to said non-active component, said controller configured to transfer a fluid intermediate said first active component, said second active component and said non-active component;
   at least one pressure sensor, said at least one pressure sensor operably coupled to said first active component and said second active component, said at least one pressure sensor further being operably coupled to said controller, said at least one pressure sensor configured to detect a user superposed on said first active component and said second active component; and
   wherein the controller transitions said first active component and said second active component intermediate a first position and a second position subsequent detection of a user being superposed thereon for at least ten minutes.

2. The seat apparatus as recited in claim 1, wherein in said first position the interior volume of said first active component is completely filled with the fluid.

3. The seat apparatus as recited in claim 2, wherein in the first position the interior volume of said second active component is completely filled with the fluid.

4. The seat apparatus as recited in claim 3, wherein in the second position the interior volume of the first active component and said second active component has a fluid level that is less than the capacity of the interior volume.

5. The seat apparatus as recited in claim 4, wherein in the second position of said first active component and said second active component a portion of the fluid disposed therein has been transferred to the interior volume of said non-active component.

6. The seat apparatus as recited in claim as recited in claim 1, wherein the first active component and second active component further include an upper surface, said upper surface of said first active component and said second active component being manufactured from a rigid material.

7. The seat apparatus as recited in claim 6, and further including a mechanical controller, said mechanical controller operably coupled to said upper surface of said first active component and said second active component, said mechanical controller configured to transition said first active component and said second active component intermediate said first position and said second position.

8. The seat apparatus as recited in claim 5, and further including a warning indicator, said warning indicator configured to provide a warning signal to a user, said warning indicator configured to provide an audio signal or a visual signal.

9. The seat apparatus as recited in claim 8, and further including an angle sensor, said angle sensor being disposed on said non-active component, said angle sensor configured to detect an angle at which the body of the seat apparatus is positioned, said angle sensor being operably coupled to said controller.

10. A seat apparatus configured to promote improved circulatory conditions for a user superposed thereon comprising:
a body, said body having a front end and a rear end, said body having a left side and a right side, said body having an upper surface and a lower surface, said body configured to have a user superposed on said upper surface, said body having a surface cushion disposed on said upper surface;
a non-active component, said non-active component being centrally located on said body, said non-active component having a left side and a right side, said non-active component extending from said front end of said body to said rear end of said body, said non-active component being rigid and having an interior volume, said non-active component being formed having a width proximate the front end of said body that is less than the width proximate the rear end of said body;
a plurality of left active components, said plurality of left active components being adjacent said left side of said non-active component, said plurality of left active components having an interior volume, said plurality of left active components being manufactured from an expandable material, said plurality of left active components having a first position and a second position;
a plurality of right active components, said plurality of right active components being adjacent said right side of said non-active component, said plurality of right active components having an interior volume, said plurality of right active components being manufactured from an expandable material, said plurality of right active components having a first position and a second position;
a controller, said controller being disposed in said body, said controller being fluidly coupled with said plurality of right active components and plurality of left active components, said controller further being fluidly coupled to said non-active component, said controller configured to transfer a fluid intermediate said plurality of right active components, said plurality of left active components and said non-active component;
a plurality of pressure sensors, said plurality of pressure sensors operably coupled to said plurality of right active components and plurality of left active components, said plurality of pressure sensors further being operably coupled to said controller, said plurality of pressure sensors configured to detect a user superposed on said plurality of right active components and plurality of left active components; and
wherein the controller transitions said plurality of right active components and plurality of left active components intermediate a first position and a second position.

11. The seat apparatus as recited in claim 10, and further including an angle sensor, said angle sensor being disposed on said non-active component, said angle sensor configured to detect an angle at which the body of the seat apparatus is positioned, said angle sensor being operably coupled to said controller.

12. The seat apparatus as recited in claim 11, wherein in said first position the interior volume of said plurality of left active components are completely filled with the fluid.

13. The seat apparatus as recited in claim 12, wherein in said first position the interior volume of said plurality of right active components are completely filled with the fluid.

14. The seat apparatus as recited in claim 13, wherein in the second position of said plurality of right active components and plurality of left active components a portion of the fluid disposed therein has been transferred to the interior volume of said non-active component.

15. The seat apparatus as recited in claim 14, and further including a warning indicator, said warning indicator configured to provide a warning signal to a user subsequent detection of a user sitting in an improper position, said warning indicator configured to provide an audio signal or a visual signal.

16. The seat apparatus as recited in claim as recited in claim 10, wherein the plurality of left active components and plurality of right active components further include an upper surface, said upper surface of said the plurality of left active components and plurality of right active components being manufactured from a rigid material.

17. The seat apparatus as recited in claim 16, and further including a mechanical controller, said mechanical controller operably coupled to said the plurality of left active components and plurality of right active components, said mechanical controller configured to transition said the plurality of left active components and plurality of right active components intermediate said first position and said second position.

* * * * *